United States Patent [19]

Cukier et al.

[11] Patent Number: 4,961,189
[45] Date of Patent: Oct. 2, 1990

[54] MULTIPLEXING SYSTEM SETTING THROUGH MASK REGISTERS

[75] Inventors: Maurice Cukier, Cagnes sur Mer; Daniel Pilost, La Gaude; Dominique Rigal, Nice, all of France

[73] Assignee: International Business Machines Corporation, Armonk, N.Y.

[21] Appl. No.: 397,216

[22] Filed: Aug. 23, 1989

[30] Foreign Application Priority Data

Sep. 13, 1988 [EP]  European Pat. Off. ........ 88480029.3

[51] Int. Cl.⁵ .............................................. H04J 3/00
[52] U.S. Cl. ................................... 370/112; 370/58.1; 370/62
[58] Field of Search ...................... 379/88, 284, 10, 15; 370/58.1, 62, 95.1, 95.3, 112; 375/8

[56] References Cited

U.S. PATENT DOCUMENTS

| | | | |
|---|---|---|---|
| 4,535,452 | 8/1985 | Sandberg et al. | 370/100 |
| 4,759,018 | 7/1988 | Buchner | 370/112 |
| 4,789,984 | 12/1988 | Swartz | 370/112 |
| 4,823,365 | 4/1989 | Loginov | 370/108 |
| 4,849,969 | 7/1989 | Annamalai | 370/112 |

FOREIGN PATENT DOCUMENTS 2116784  10/1971  Fed. Rep. of Germany.
3533314   3/1987  Fed. Rep. of Germany.
3533315   3/1987  Fed. Rep. of Germany.

Primary Examiner—Douglas W. Olms
Assistant Examiner—Christopher O. Edwards
Attorney, Agent, or Firm—Edward H. Duffield

[57] ABSTRACT

Data multiplexing system for dispatching an input serial bit stream onto a plurality of ports, or multiplexing the data bits received from a plurality of ports as a serial bit stream. The system mainly comprises for each port, a mask register (14) loaded with a N-bit mask work wherein bits set to 1 indicate which bits of an aggregate register (10 or 56) are to be loaded or to be transferred, and a scan counter (20 or 46) starting being incremented at a high frequency at each transition of a first category, up or down, of a clock circuit (12 or 40), until the mask bit corresponding to the scan counter contents is a bit 1, whereby the corresponding cell of the aggregate register is transmitted to the associated port or loaded with the bit received at this time by the associated port.

10 Claims, 4 Drawing Sheets

MULTIPLEXING SYSTEM SETTING THROUGH MASK REGISTERS

FIELD OF THE INVENTION

The invention relates to multiplexing systems in data transmission, and particularly a multiplexing system setting through mask registers, adapted to be incorporated in a multiplex modem.

PRIOR ART

In the transmission of data between a first data terminal equipment (DTE) and a second DTE over telephone lines, each DTE is equipped with a modem wherein the carrier signal is modulated by the data in a modulator at the sending end and demodulated in a demodulator at the receiving end.

Where the transmission of data takes place between a local DTE and several remote DTEs, the latter often are connected in a multipoint configuration, that is, connected in parallel to a single transmission line from the local DTE. It is apparent that, in such a configuration, it is desirable to use one modem for a number of DTEs rather than one modem per DTE. To this end, the state of the art provides two possible solutions that involve equipping the modem either with a multiplexer or with a so-called fan-in/fan-out parallel distribution device.

The multiplexer enables the modem to be connected to several DTEs that receive or transmit data on a time-multiplex basis. That is, each data byte sent over the single transmission line is formed by juxtaposing groups of bits received from or sent to each DTE, with the number of bits in each group being dependent on the transmission speed assigned to the corresponding DTE.

In the parallel distribution technique called fan-in/fan-out, the modem is attached to several DTEs, but the data are not multiplexed. When the data are received by the modem, they are simultaneously sent to all attached DTEs. In the other direction of transmission, contrary to the multiplexing technique, only one of the attached DTE's can transmit its data at a time.

The problem which is raised when the modem is equipped with a multiplexer, is the distribution of the bits, forming each byte received from the single transmission line, to the different ports which are each connected to a different DTE; or the way the bits received from the different DTE's are arranged in the byte which is to be transmitted over the single transmission line.

The technique currently used to solve this problem consists in assigning the different speeds which can be supported by each port according to predetermined configurations, generally in compliance with the CCITT recommendations. The bits or groups of bits of each byte, dedicated to each port, are also predetermined for each configuration. To each port is assigned a shift register the capacity of which corresponds to the number of bits which are dedicated to the port. At each baud time, that is when a byte is received from the single transmission line, the bits dedicated to each port are loaded into the corresponding shift register from which they are serially transmitted to the DTE in accordance with the speed assigned thereto. Reciprocally, in the other way of transmission, the bits are received serially from the DTE's and loaded in the corresponding shift registers from which they are output in parallel at each baud time to form the byte to be transmitted over the single transmission line.

Such a technique requires that a set of shift registers be respectively dedicated to each possible configuration. This results in a limitation of the number of configurations which can be implemented, or a prohibitive hardware cost if it is required that any configuration be settable.

OBJECTS OF THE INVENTION

It is therefore an object of the present invention to provide a multiplexing system between a single transmission line and several ports or reciprocally, wherein any configuration of speeds assigned to the terminals is settable without a prohibitive cost.

BRIEF SUMMARY OF INVENTION

One object of the invention is achieved by providing a data multiplexing system for dispatching an input serial data bit stream onto a plurality of output ports. It comprises an aggregate register common to the plurality of ports which is loaded every predetermined time interval by a number N of bits of the serial data bit stream. It also comprises control devices, each one being associated with a port and including a clock circuit which determines the bit rate at which are transmitted the output serial data bits allocated to the associated port. The control device associated with each port comprises a mask register loaded with an N-bit mask word wherein bits of a first polarity indicate which bits of the N bits contained in the aggregate register are to be output by the associated port, and a scan counter which is incremented at a high frequency at each transition of a first category (up or down) of the clock associated with the control device until the mask bit corresponding to the scan counter contents is a bit of the first polarity, the corresponding bit of the N bits contained in the aggregate register being then output by the associated port.

Another object of the invention is achieved by providing a data multiplexing system for multiplexing the data bits received from a plurality of input ports as an output serial data bit stream over a single transmission line. The multiplexing system comprises an aggregate register common to the plurality of ports which transfers into a transmission register at every predetermined time interval a number N of bits. It includes control devices, each one being associated with a port, and including a clock circuit which determines the bit rate at which are received the input data bits by the associated port. The control device associated with each port comprises a mask register loaded by an N-bit mask word wherein bits of a first polarity indicate which locations of the aggregate register are to be loaded by the input data bits received by the associated port. The control devices also include a scan counter which is incremented at a high frequency at each transition of a first category (up or down) of the clock associated with the control device until the mask bit corresponding to the scan counter contents is a bit of the first polarity, whereby the corresponding location of the aggregate register is loaded with the bit received by the associated port.

The invention will be more fully ascertained from the following description when read in conjunction with the accompanying drawings wherein:

DETAILED DESCRIPTION OF INVENTION

The data multiplexing system of the invention for dispatching the serial bit stream received from a single transmission line, between several ports at different speeds, will now be described in reference to FIGS. 1 and 2.

Figure 1:
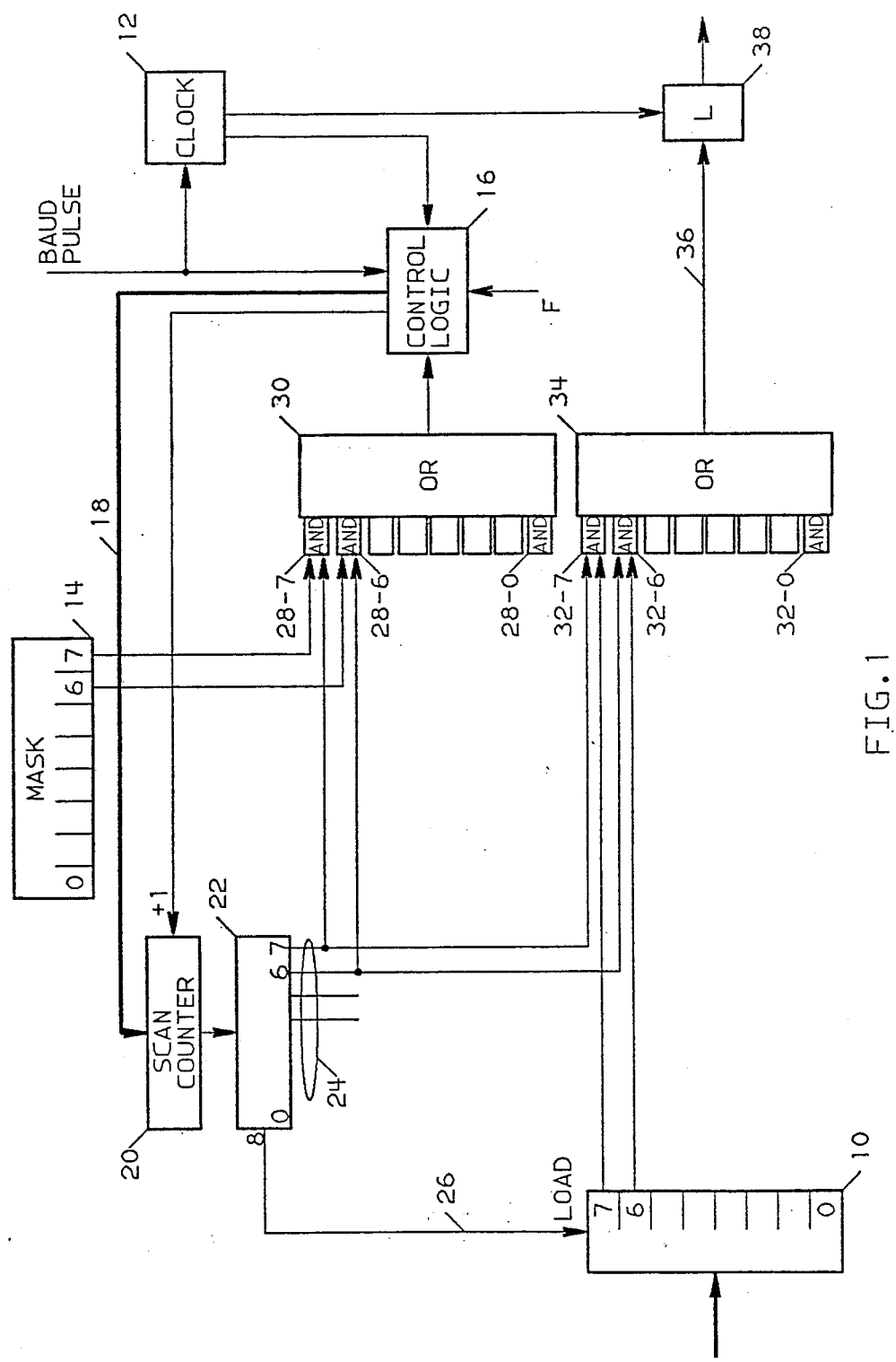
FIG. 1 is a block diagram representing the portion of a data multiplexing system used for dispatching a serial bit stream onto one among a plurality of ports, according to the invention.

In the embodiment described on FIG. 1, it is assumed that the multiplexing system is incorporated in a modem which is connected to a telephone line. The analog signal received from the telephone line is demodulated and converted into a serial bit stream before being provided to the multiplexing system of FIG. 1. It is also assumed that the serial bits are loaded in a Receive register (not shown in FIG. 1), the contents of which is a byte of 8 bits corresponding to the number of bits received during a baud time.

The 8 bits received at each baud time have to be multiplexed to several ports, the number of which is comprised between one (all the 8 bits are for this single port) and eight (each port receives only 1 bit) assuming that the contents of masks do not change. The block diagram of FIG. 1 depicts the circuitry associated with each port, except aggregate register 10 which is common to all ports. For a given port, the speed of clock 12 is determined by the number of bits assigned to the port at each baud time. Assuming that the port receives n bits at each baud time, the speed of clock 12 is, with a modulation rate R, equal to n.R. Mask register 14, which is a 8-bit register, contains a mask word having n bits set to "1" and the other bits being set to "0". This means that the n corresponding bits of aggregate register 10 are assigned to this port. It must be noted that these n bits can be consecutive or not depending upon the sources which transmit the data bits at the other end of the telephone line. If one port is not used, all mask bits are set to zero, which causes the clock to be static.

At each baud time, a baud pulse is applied to clock 12 to determine the up transition of the clock. The baud pulse id also applied to control logic 16 which then forces the contents of scan counter 20 to "7" by means of bus 18. Scan counter 20 is a modulo 9 counter which is incremented, when necessary, at a high frequency by control logic 16. To this purpose, control logic 16 is controlled by a clock F which can be the clock provided by the crystal oscillator of the modem. In the preferred embodiment of the invention such a frequency is equal to 2.592 mHz.

When scan counter 20 has been forced to "7", it is incremented by control logic 16. As shown on FIG. 1, decode circuit 22 converts the contents of scan counter 20 into a bit 1 output on the one output line 24 which corresponds to the counter contents.

Accordingly, the incrementation of scan counter 20 to the value "8" enables aggregate register 10 to be loaded with a 8-bit word from the Receive register (not shown), by means of a load pulse on line 26 corresponding to the output 8 from decode circuit 22. Then, scan counter 20 keeps on being incremented by control logic 16 until the output line 24 that is activated, corresponds to a cell of mask register 14 which contains a bit "1". At this time, one of AND circuits 28-0 to 28-7 (associated to the activated output line 24 and the corresponding cell of mask register 14) is enabled by its inputs from decode circuit 22 and mask register 14, both equal to 1. A bit "1" is then sent by means of OR circuit 30, to control logic 16 which stops incrementing scan counter 20. At this time, the bit of aggregate register 10 which corresponds to the activated output line 24, is transmitted by the associated one of AND circuits 32-0 to 32-7 and by OR circuit 34 to line 36. Then, on the down-transition of clock 12 latch 38 samples the bit transmitted on line 36. Latch 38 stores this bit until the next down transition of clock 12.

Figure 2:
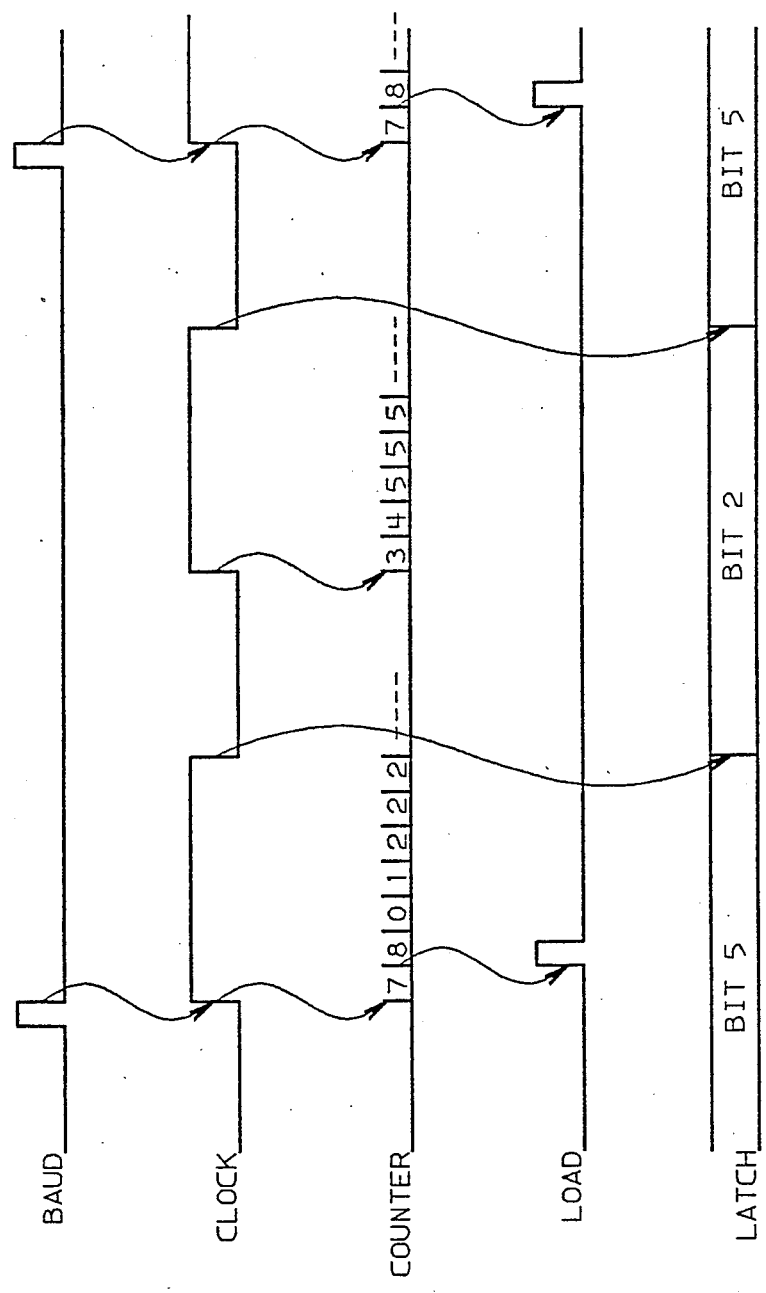
FIG. 2 is a timing diagram showing the sequencing of the operations occurring in the system of FIG. 1 associated with a two-bit port.

FIG. 2 shows the timing diagram for an example wherein the port is assigned two bits at each baud time. Assuming that these two bits are bits 2 and 5 of the Receive register, this means that only the bits 2 and 5 of the mask register are set to "1". Now, if the modulation rate is R=2400 bauds, the clock shown on the second line of the diagram, has a frequency of $2 \times 2400 = 4800$, and includes two up-transitions and two down-transitions within the time interval between two baud pulses. As shown on the figure, the up-transition of the clock corresponding to the occurrence of the baud pulse sets the scan counter to 7, the counter starting incrementing at this time. When its contents have the value 8, the load pulse (fourth line of the diagram) enables the aggregate register to be loaded with a 8-bit word to be multiplexed onto the different ports. The scan counter keeps on being incremented until its contents reach the value 2. As described in reference to FIG. 1, the scan counter is stopped and its contents remain at the value 2. At down transition of the clock, bit 2 of the aggregate register is latched (fifth line of the diagram) for a period of the clock. Then, at the up-transition of the clock, the scan counter starts agains incrementing until its contents reach the value 5. Again, at the following down-transition of the clock, bit 5 of the aggregate register is latched.

In the embodiment described in reference to FIG. 1, it has been assumed that 8 bits were received from the single transmission line at each baud time, and accordingly, the aggregate register is a 8-bit register. In fact, the capacity of the mask register only corresponds to the maximum data bit rate which can be used. For instance, with a 8-bit register and assuming that the modulation rate is 2400 bauds, it is possible to receive up to $8 \times 2400 = 19\,200$ bits/s. In this case, the mask register must also have a capacity of 8 bits, and scan counter a maximum value of $8+1=9$.

But, it is possible to receive less than 8 bits at each baud time with the circuitry shown on FIG. 1.

For example, with a data bit rate of 14 400 bits/s, only 6 bits are received at each baud time. In this case, only locations 0 to 5 of the aggregate register would be used. Likewise for the mask register. As far as the scan counter is concerned, the only condition is that its maximum value must be at least equal to the number of bits received at each baud time plus one, one of the counter values being reserved for loading the aggregate register.

Another possibility is to have an aggregate register (which is common to all ports) of a capacity corresponding to the maximum data bit rate, for example 8 bits, and to have the multiplexing circuitry of the port including the mask register and the scan counter, adapted to the data bit rate effectively used by the modem.

The data multiplexing system of the invention for multiplexing and transmitting the data bits received from a plurality of input ports as a serial data bit stream over a single transmission line, will now be described in reference to FIGS. 3 and 4.

Figure 3:
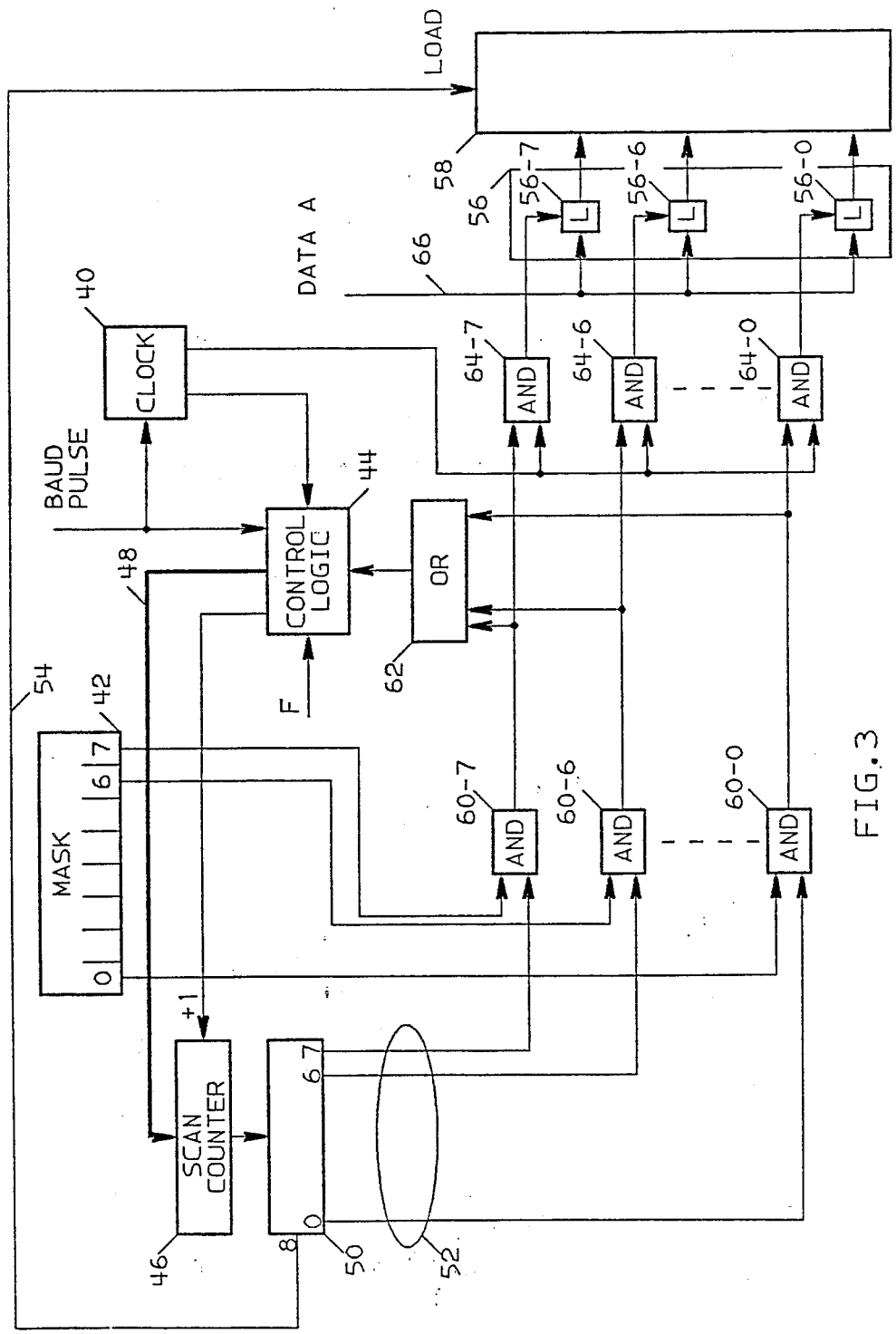
FIG. 3 is a block diagram representing the portion of a data multiplexing system used for multiplexing the data bits received from one among a plurality of ports as a serial bit stream.

It is assumed that, in the embodiment described on FIG. 3, the data multiplexing system is incorporated in a modem connected to a single telephone line on a side, and several DTE's on the other side. The data bits received from the DTE's as serial bit streams, are multiplexed into 8 bits words, and then converted into an analog signal before being transmitted onto the telephone line.

It is also assumed that the described multiplexing system is associated to the port A, and that there may be several other ports B, C, . . . . With a byte of 8 bits transmitted at each baud time, the number of bits received from port A can be comprised between zero and eight bits, in which case there are no other ports than port A.

The speed of clock 40 is determined by the number of bits received by port A at each baud time. Assuming that port A receives n bits at each baud time from its associated DTE, the speed of clock 40 is, with a modulation rate R, equal to n.R. Mask register 42, a 8-bit register, contains a mask word having n bits being set to "1" and the other bits being set to "0". it must be noted that these n bits can be consecutive or not, depending on the configuration of the DTEs receiving the data which is installed at the other end of the telephone line.

At each baud time, a baud pulse is applied to clock 40 to determine the down transition of the clock. The baud pulse is also applied to control logic 44 which, at this time, forces the contents of scan counter to "7" by means of bus 48. Scan counter 46 is a modulo 9 counter which is incremented, when necessary, at a high frequency by control logic 44. To this purpose, control logic 44 is controlled by a clock F which can be the clock provided by the crystal oscillator of the modem. In the preferred embodiment, the frequency of the modem oscillator is 2.592 MHz.

As soon as scan counter 46 has been forced to "7", it is incremented by control logic 44. As shown on FIG. 3, decode circuit 50 continually converts the contents of counter 46 into a bit "1" on a corresponding line amongst output lines 52.

Accordingly, when the contents of scan counter 46 reaches "8", line 54 corresponding to the counter value 8, is activated, and a load pulse enables 8-bit aggregate register 56 to transfer its contents to 8-bit transmit register 58 common to all ports. Then, scan counter 46 keeps on being incremented by control logic 44 until the output line 52 which is activated at this time, corresponds to a cell of mask register 42 which contains a bit "1". One of the AND circuits 60-0 to 60-7 associated to the activated output line 52 and the corresponding cell of mask register 42, is then enabled by its inputs both equal to 1. A bit "1" is sent, by means of OR circuit 62, to control logic 44 which stops incrementing scan counter 46. The bit "1" at the output of AND circuit 60 which has been enabled, enables the up transition of clock 40 to be transmitted by the one of AND circuits 64-0 to 64-7 corresponding to the enabled AND circuit 60. The up-transition of the clock is then used for clocking one of latches 56-0 to 56-7 (which are the cells of aggregate register 56) and sampling the bits received from port A on line 66.

The process described above is repeated for each bit received from port A within a baud time. At each up transition of clock 40 within the baud time, one of latches 56-0 to 56-7 is clocked and enables the bit received on line 66 to be stored. It must be noted that, for each port, latches 56-0 to 56-7 corresponding to the cells of the associated aggregate register, are set by a data line identical to line 66, the cells which are loaded being of course, different for each port. Likewise the latches, for each port are clocked by systems identical to the one described on FIG. 3, associated with each of the other ports. It is only at the beginning of the next baud time, when scan counter 50 is forced to "7" and then incremented to "8" that the load pulse present on line 54 enables the completed contents of all aggregate registers 56 to be transferred to transmit register 58 before being transmitted in the form of a serial bit stream and converted into an analog signal. The load pulse on line 54 occurs at the same time for each port and there is a multiplexer, not shown on the figure, enabling the contents of aggregate registers of all the ports to be transferred into the common transmit register 58 at the same time.

Figure 4:
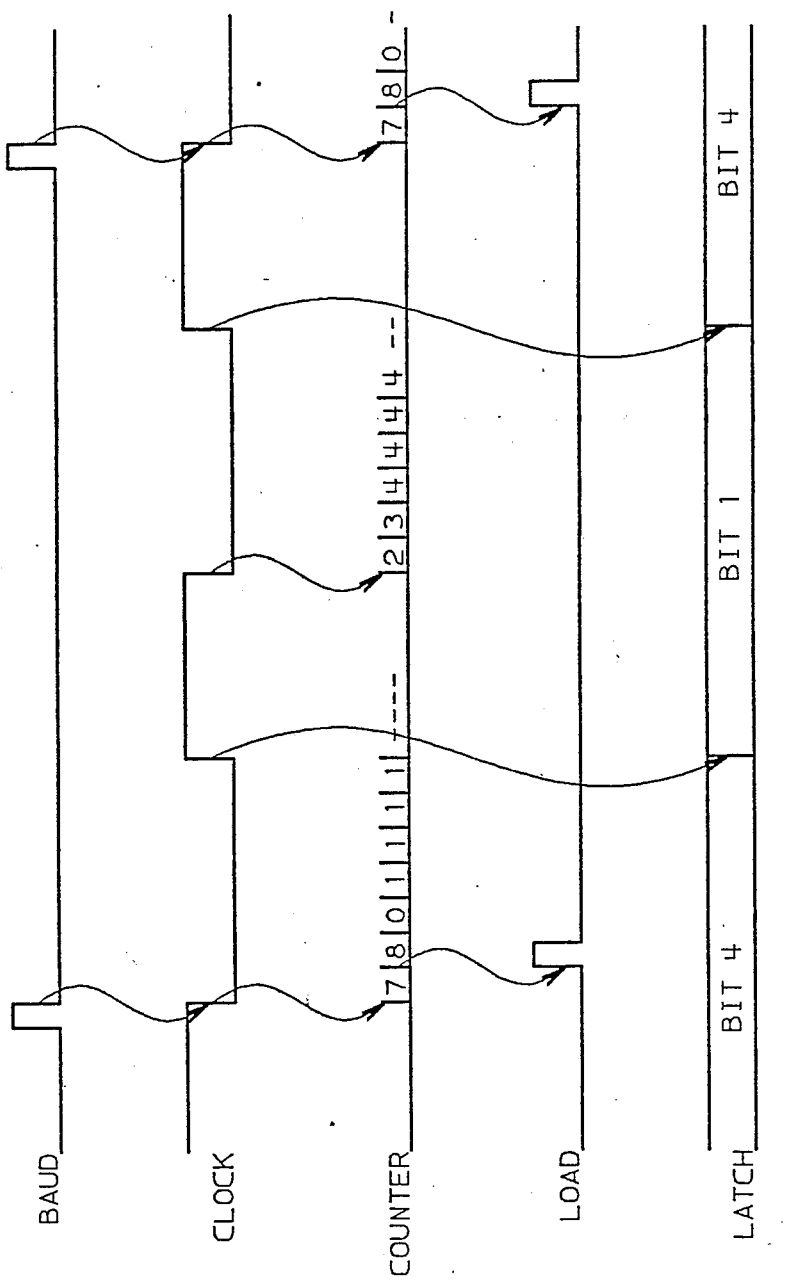
FIG. 4 is a timing diagram showing the sequencing of the operations occurring in the system of FIG. 3 associated with a two-bit port.

FIG. 4 depicts the timing diagram for an example wherein the port is providing two bits at each baud time. It is assumed that these two bits are bits 1 and 4 of the transmit register, which means that only bits 1 and 4 of the mask register are set to "1". With a modulation rate $R = 2400$ bauds, the clock shown on the second line of the diagram, has a frequency of $2 \times 2400 = 4800$ Hz, and includes two up-transitions and two down-transitions within the time interval between two baud pulses. As shown on the figure, the down-transition of the clock corresponding to the occurrence of the baud pulse sets the scan counter to "7", the counter starting being incremented by the control logic at this time. When its contents have the value "8", the load pulse (fourth line of the diagram) enables the transmit register to be loaded with the contents of the aggregate register. The scan counter keeps on being incremented until its contents reach "1". The incrementation of the scan counter is then stopped and its contents remain at the value "1". At the next up-transition of the clock, the bit present on the data line from the associated port is latched (fifth line of the diagram) for a period of the clock. At the down-transition of the clock, the scan counter starts again incrementing until its contents reach "4". Again, at the following up-transition of the clock, the bit present on the data line from the port (the second data bit during the baud time) is latched.

As for the multiplexing system used for the data transmission from the single transmission line to the ports, the aggregate register and the mask register are 8-bit registers based upon a rate of 8 bits transmitted at each baud time. With a modulation rate of 2400 bauds, it is thus possible to transmit $8 \times 2400 = 19\ 200$ bits/s. But, it is possible to transmit less than 8 bits at each baud time with the circuit shown on FIG. 3. For example, with a data bit rate of 9600 bits/s, only 4 bits are transmitted at each baud time. Accordingly, only locations 0 to 3 of the mask register and the aggregate register would be used.

As to the multiplexing system of FIG. 1, the scan counter must have a maximum value at least equal to the number of bits transmitted at each baud time plus one insofar as one of the counter values is reserved for transferring the contents of the aggregate register to the transmit register.

It is also possible to keep an aggregate register having a capacity corresponding to the maximum data bit rate (for instance 8 bits), and to have the multiplexing circuitry including the mask register and the scan counter adapted to the data bit rate effectively used by the modem.

In FIGS. 1 and 3, no details of the control logic have been given as being not essential features of the invention. But it is easy for the man of the art to implement such a logic in logical circuits, using the teachings of the above description, that is a logic capable of incrementing or loading the scan counter in response to the transitions of the clock.

In a general way, the data multiplexing system according to the invention is implemented in hardwired logic, but can be also implemented in software. In the latter case, it is the signal processor of the modem which executes a program implementing the functions described in reference to the block diagrams of FIGS. 1 and 3. Such a program can be easily built from the teachings given by the description and the accompanying drawings.

In the above description, it has been assumed that the system of the invention was used as a multiplexer in the modem, which is the true object of such a system. But, the multiplexing system according to the invention can also be used in a modem equipped with the fan-in/fan-out parallel distribution device. In this case, all the bits of the mask register are set to "1" for each port. In the way of transmission from the single line to the DTEs, the bits of the common aggregate register are dispatched to all ports. In the other way of transmission, as only one DTE can transmit at a time, the ports except the one corresponding to this DTE are disabled, all the bits which are loaded into the common transmit register being provided by this port associated with the DTE which is enabled to transmit data.

We claim:

1. Data multiplexing system for dispatching an input serial bit stream onto a plurality of output ports comprising an aggregate register (10) common to the plurality of ports which is loaded every predetermined time interval by a number N of bits of the serial bit stream, and control devices, each one being associated with each port, and including a clock circuit (12) which determines the bit rate at which are output the data bits allocated to the associated port; said system being characterized in that each control device associated with a port comprises:

a mask register (14) loaded with a N-bit mask word wherein bits of a first polarity indicate which bits of said N bits contained in said aggregate register are to be transmitted to the associated port; and a scan counter (20) which starts being incremented at a frequency much higher than the highest bit rate at which can be output data bits allocated to a port at every transition of a given polarity of said clock circuit, until the mask bit corresponding to the scan counter contents is a bit of said first polarity, whereby the corresponding bit of said N bits contained in said aggregate register is transmitted to the associated port.

2. A data multiplexing system according to claim 1 further comprising a latch (38) which is clocked by the transition of the other polarity of said clock circuit (12) which follows said transition of a given polarity starting the incrementation of said scan counter (20), said latch being set by said bit transmitted by the aggregate register (10).

3. Data multiplexing system according to claim 1 or 2 wherein said scan counter (20) is forced to the value N corresponding to said number N of bits by a pulse received by said system at the beginning of said predetermined time interval, said counter being then incremented to the value N+1 at which it provides a pulse enabling said aggregate register (10) to be loaded while it is reset to zero.

4. Data multiplexing system according to claim 1 or 2 further comprising a control logic (16) which forces said scan counter (20) to the value of said N in response to a pulse received at the beginning of said predetermined time interval, starts incrementing said counter in response to said transition of a given polarity from said clock circuit (12), and stops incrementing said counter when the bit of said mask register (14) corresponding to the counter value is set to said first polarity.

5. Data multiplicity system according to claim 1 or 2 wherein the data bit rate of a port is determined by multiplying the modulation rate of the system which is the number of said predetermined time intervals per second, by the number of bits of said mask register (14) set to said first polarity.

6. Data multiplexing system for multiplexing the data bits received from a plurality of input ports as an output serial data bit stream, comprising a transmit register (58) common to the plurality of ports which receives every predetermined time intervals, a number M of bits from the ports, and control devices, each one being associated with each port, and including a clock circuit (40) which determines the bit rate at which are received the input data bits by the associated port and an aggregate register 56 which is loaded with the bits received from said port; said system being characterized in that each control device associated with a port comprises:

a mask register (42) loaded by a N-bit mask word wherein bits of a first polarity indicate which locations of said aggregate register are to be loaded with the input data bits received by the associated port; and a scan counter (46) which starts being incremented at a frequency much higher than the highest bit rate at which can be output data bits allocated to a port at every transition of a given polarity of said clock circuit, until the mask bit corresponding to the scan counter contents is a bit of the first polarity, whereby the corresponding location of said aggregate register is loaded with the bit received at this time by the associated port.

7. Data multiplexing system according to claim 6 wherein said aggregate register (56) is composed of M latches for storing the Bits received during said predetermined time interval, said latches being clocked by the transition of the other polarity which follows said transition of a given polarity starting the incrementation of said scan counter (46), the latch corresponding to said mask bit of first polarity being set by said bit received at this time by the associated port.

8. Data multiplexing system according to claim 6 or 7 wherein said scan counter (46) is forced to the valve M corresponding to said number M by a pulse received by said system at the end of said predetermined time interval, said counter being then incremented to the value M+1 at which it provides a pulse enabling the contents of said aggregate register (56) to be transferred into said transmit register (58) while it is reset to zero.

9. Data multiplexing system according to claim 6 or 7 further comprising a control logic (44) which forces said scan counter (46) to the value M in response to a pulse received at the end of said predetermined time interval, starts incrementing said counter in response to said transition of given polarity from said clock (40), and stops incrementing said counter when the bit of said mask register (42) corresponding to the counter value is set to said first polarity.

10. Data multiplexing system according to claim 6 or claim 7 wherein: the data bit rate of a port is determined by multiplying the modulation rate of the system which is the number of said predetermined time intervals per second, by the number of bits of said mask register (42) set to said first polarity.

* * * * *